US005281762A

United States Patent [19]

Long et al.

[11] Patent Number: 5,281,762

[45] Date of Patent: Jan. 25, 1994

[54] MULTI-CONDUCTOR CABLE GROUNDING CONNECTION AND METHOD THEREFOR

[75] Inventors: William B. Long, Camp Hill; Robert G. Leggett, Elizabethtown, both of Pa.

[73] Assignee: The Whitaker Corporation, Wilmington, Del.

[21] Appl. No.: 901,063

[22] Filed: Jun. 19, 1992

[51] Int. Cl.[5] .......... H02G 15/068

[52] U.S. Cl. .......... 174/78; 29/857; 29/867; 174/36; 174/117 F; 439/497; 439/579; 439/610

[58] Field of Search .......... 174/71 C, 72 R, 72 TR, 174/78, 117 F, 117 R, 36; 439/608, 610, 497, 579, 580; 29/857, 867

[56] References Cited

U.S. PATENT DOCUMENTS

| | | | |
|---|---|---|---|
| 3,322,885 | 5/1967 | May et al. | 174/78 |
| 3,375,483 | 3/1968 | Phillips | 439/579 |
| 3,744,128 | 7/1973 | Fisher et al. | 29/858 |
| 4,296,390 | 10/1981 | Vanderheyden et al. | 333/182 |
| 4,365,856 | 12/1982 | Yaegashi et al. | 439/497 |
| 4,433,887 | 2/1984 | Sado et al. | 174/88 R |
| 4,497,533 | 2/1985 | Genova et al. | 29/859 |
| 4,614,398 | 9/1986 | Wright et al. | 439/539 |
| 4,770,641 | 9/1988 | Rowlette | 439/86 |
| 4,781,620 | 1/1988 | Tengler et al. | 439/497 |
| 4,828,512 | 5/1989 | McCormick et al. | 439/495 |
| 4,929,195 | 5/1990 | Seidoh | 439/610 |
| 5,038,001 | 8/1991 | Koegel et al. | 174/112 |
| 5,041,183 | 8/1991 | Nakamura et al. | 174/88 R |
| 5,046,966 | 9/1991 | Snyder et a. | 439/579 |

*Primary Examiner*—Morris H. Nimmo

[57] ABSTRACT

A grounding connection and method for use with multi-wire cable (10) of a type having a plurality of individual cables (12) arranged in side-by-side relationship with each cable including an outer insulation sheath (14) extending around a relatively fragile, thin ground shield (16) in turn extended around a dielectric sleeve (18) carrying a fine signal wire (20) includes the provision of a body (22) of conductive plastic molded or cast around the exposed shield to provide a permanent electrical interconnection and commoning of the shield (16) of the multiple cables. A grounding bus (26) is used with the body (22) to interconnect ground circuits to external ground paths of circuit boards or the like. An alternative embodiment includes plastic material having sufficient strength to form fasteners (50) or latches (54) extending the use of the body (22). A thin wall plastic housing (60) may be used as an alternative definition of a cavity into which the material is poured to form the body (22).

9 Claims, 4 Drawing Sheets

MULTI-CONDUCTOR CABLE GROUNDING CONNECTION AND METHOD THEREFOR

This invention relates to a multi-conductor cable grounding connection and a method of manufacture therefor.

BACKGROUND OF THE INVENTION

Demand for high density packaging has led to the development of multi-wire cable having signal conductors, grounding conductors, and shielding arranged on very close centers. To do this, it has been necessary to utilize extremely fine and frequently fragile elements. For example, signal and conductor or drain wires may have diameters on the order of 0.003 to 0.009 inches. Shielding ground is typically provided by a wrap-around conductive film on the order of 0.001 inch or fine braid with numbers of cables having such elements and characteristics combined together in ribbon form. These cables are made to have specific impedances relative to the types of signals required to be transmitted, and care must be taken to keep ground and signal spacings appropriate to avoid discontinuities with particular care taken in stripping such cable of the outer insulating and protective sheath, engaging the different conductors and mechanically and electrically interconnecting such conductors to signal, ground, and shielding circuits of either a connector or a circuit board or the like. Thin foil grounding and shielding conductors have proven to be most difficult to reliably terminate, by solder or mechanical means providing an electrical interconnection thereto. In certain instances, a fine drain or separate wire is used, being engaged along the length of the foil conductor to make such interconnection. As a result, termination of multi-wire cable, and particularly multi-wire coaxial cable, has proven to be time consuming, difficult, anticostly with numerous defects requiring expensive cable assemblies to be scrapped.

U.S. Pat. No. 4,929,195 granted May 29, 1990 and directed to a shielded connector, teaches the use of an electrically conductive body called a stopper that is applied to the shielding of a multi-wire cable. The stopper includes an outer groove and serves to mechanically and electrically connect the shielding of the cable to an outer shielding of a connector. This serves to protect against tensile forces applied to the cable and shield wire and further, to interconnect the shield wire to the outer metallic portions of the connector without the use of solder. U.S. Pat. No. 4,614,398 granted Sep. 30, 1986 is directed to a shielded cable terminal connection wherein a resilient bushing of conductive material is inserted between the shield portions of a coaxial cable and the inner surface of a backshell housing that is crimped down against the resilient bushing to provide a mechanical and electrical connection to coaxial cable and a connector. U.S. Pat. No. 3,744,128 granted Jul. 10, 1973 teaches the use of making shielded connector assemblies utilizing an electrically conductive potting material to provide a conductive path between cable shield and the metallic housing of a connector. Also of background is U.S. Pat. No. 4,828,512 granted May 9, 1989 and drawn to a connector for flat electrical cable employing an elastomeric material that is conductive to enclose the connection for EMI/EMP shielding. Of these prior art teachings, only U.S. Pat. No. '512 appears to deal with small or very fine conductors, and such teaching is confined to a particular shielded flat flex cable employing a low durometer elastomeric material and small conductive balls to effect an interconnection of cables.

Accordingly, it is an object of the present invention to provide an electrical connection of multi-wire cables and method that facilitates a common electrical grounding and mechanical holding of the fragile parts of such cable. It is still a further object to provide an electrical connection and method of manufacture facilitating the interconnection of fine foil, ground and shielding conductors of multi-wire cable. It is a further object to provide an improved electrical connection and method of manufacture of a common grounding element having features facilitating mounting and retention of cables relative to a further connector or circuit. It is a final object of the invention to provide a novel housing construction in conjunction with a casting or molding of plastic material into such housing around the shielding of fine multi-wire cable.

SUMMARY OF THE INVENTION

The present invention achieves the foregoing objectives through the provision of a connection and method that strips away the ends of a multi-wire cable, such as a coaxial cable, to expose the grounding and shielding foil that surrounds a dielectric medium and a signal conductor, followed by a casting of conductive elastomeric material over the segments of stripped foil to effect a common ground of the foil without solder or other mechanical connection thereto. In one embodiment, the body thus formed is made to include a regular box-like volumetric shape that can be utilized to fit within a connector to facilitate termination of the signal conductors of the cables and of the common shielding conductors. In another embodiment, the body of conductive plastic material is made to include surfaces that allow the application of fasteners to the body directly to form, in essence, a housing. The surfaces may include ears having apertures therein to allow the application of fasteners or latches allowing the body to be snapped into a fixture or a connector. In one embodiment, a commoning bus is included in the process to be molded into the body and is made to include contact fingers that extend from the body to engage shielding or grounding circuits on a connector or a printed circuit board or the like. In a still further embodiment, a thin wall, plastic housing adapted to snap together around the stripped ends of a multi-wire coaxial cable or the like is made to include an aperture or apertures allowing the interior volume to be filled with conductive elastomeric material to form the body, the plastic housing either being later removed or left in place permanently to insulate against unwanted and accidental contact with other circuits. The housing may include a bus bar in the base thereof with contact fingers extending out of the housing for interconnection to the conductive body therein and the foil grounding shields of a multi-wire cable. The invention contemplates a number of materials that are essentially of a plastic and insulating material loaded with conductive particles, fibers, platelets, to render the body sufficiently conductive to achieve good, low-resistance, and stable interconnection with the foil of a cable to extend a ground path to a circuit with which the cable is used. The invention contemplates that the loading of the plastic material with conductive elements be controlled to assure that the body will have an appropriate mechanical strength for holding the cables together in position relative to a connector or connection and in certain instances, allowing the forming of surfaces, fasteners, latches or the like out of the body material. The invention also contemplates the use of conductive gels contained within the version including the thin wall housing, such gels readily providing adequate interconnection with low force engagement with the foil. An important aspect of the invention is the provision of a "broad area of contact" between the relatively large areas of exposed foil and that of the body as contrasted with the "asperity" interconnection, typical of most electrical connections with conductors.

IN THE DRAWINGS

DETAILED DESCRIPTION OF THE INVENTION

Figure 1:
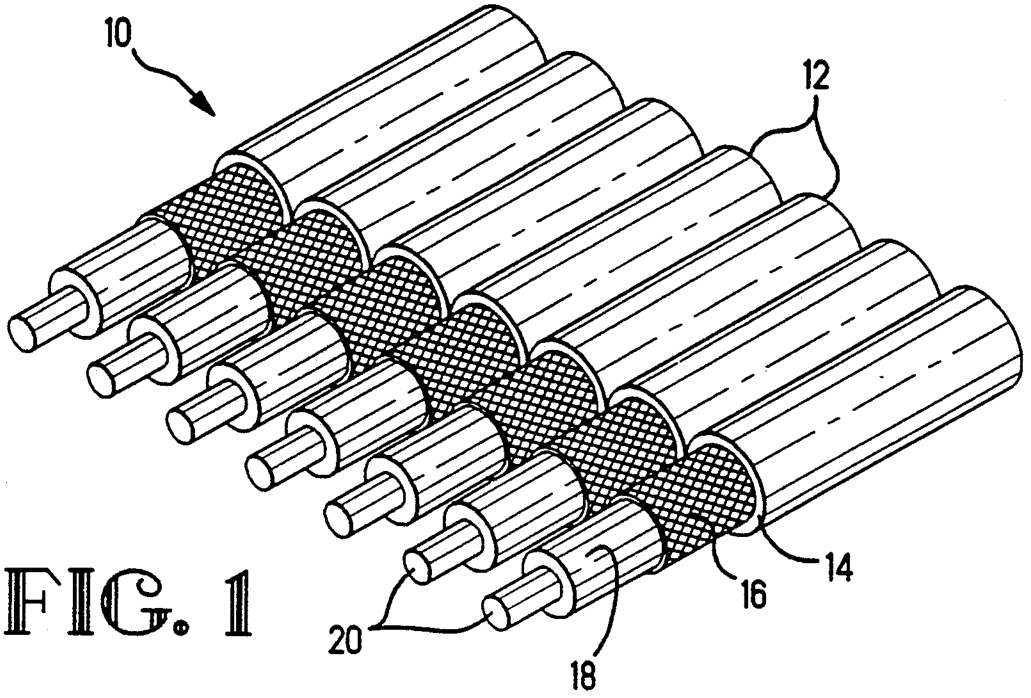
FIG. 1 is a perspective of the end of a multi-wire cable showing the different elements as stripped preparatory to application of the method of the invention.

Referring now to FIG. 1, a multi-wire cable 10 is shown including a plurality of individual multi-wire cables 12 that are in a coaxial form in the illustration. Each of the cables 12 includes an outer sheath or jacket 14 made of an insulating material to hold the cable elements together and protect the cable integrity dimensionally as well as against moisture and the like. Each cable 12 further includes a grounding shield 16, typically formed of a conductive braid of fine wires as shown; or of foil, aluminum foil and copper foil formed of very thin coatings of such material on backing film such as mylar or the like. Within shield 16 is a dielectric medium in the form of a sleeve 18, typically extruded or otherwise formed over a center signal conductor 20. The conductor 20 is typically formed of solid or stranded copper wire that may be plated with either non-precious or precious metals, depending on the technique of termination employed. Cables such as 10 come in a variety of sizes with individual cables 12 numbering from two or three up to forty or more, the cables frequently being bound together by adhesive or by coextrusion of the outer jacket 14 and, in certain cases, a weaving or the use of a backing sheet or film to which they are bonded. Cables such as 10 come in a variety of geometries, including the coaxial geometry shown and in certain cases, other geometries where signal and ground conductors are held spaced apart by a suitable dielectric medium to give a controlled impedance to the cable, 50, 70, and 90 ohm impedance cables being widely employed. In certain instances, again depending upon the type of termination employed, a further wire, sometimes termed a drain wire or a ground wire, is applied along the length of the cable in connection with the grounding shield 16 adjacent the conductive side of such if it is foil on a film. Frequently, this drain wire is or may be located at any point around the periphery of the foil due to the high speed and low cost extrusion process employed. In other instances, the drain wire position is held to be in the same location, right or left and side of the cable, to facilitate mass termination through IDC techniques employed for both the signal wire and the drain wires. In most cases, these wires, signal and/or drain, braid or conductive foil are extremely fragile and difficult to handle without breakage or damage. Needless to say, damage or breakage of the wire or foil of even a single cable 12 can result in a failure of function of the devices served by the cable. When dealing with a multi-wire cable of 20, 30 or 40 individual cables, the difficulty in carefully unwrapping the shield 16 of each cable and of positioning such shielding to be terminated in some fashion can be readily appreciated.

Figure 2:
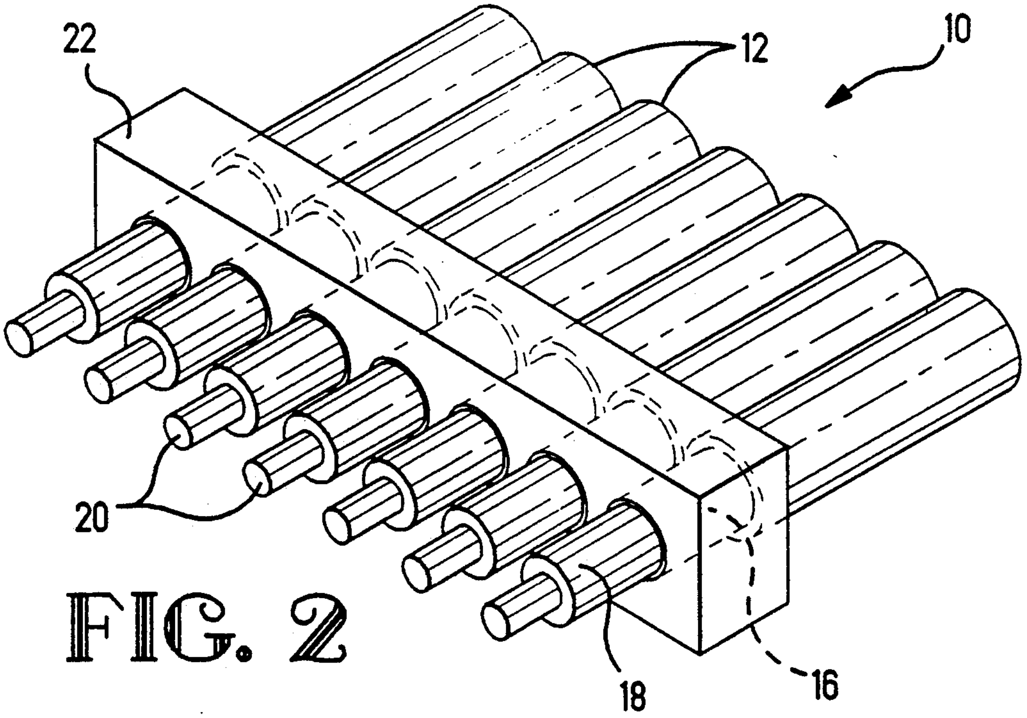
FIG. 2 is a view of the cable of FIG. 1 having an encapsulation of conductive material over the ground and shielding braid of the cable.

Referring now to FIG. 2, the cable 10, including the individual cables 12 as shown stripped in FIG. 1, are encapsulated by the application of a body 22 over the stripped segments of shields 16. The body 22 is simultaneously formed as by molding or casting a conductive plastic material around the stripped segments of the shields 16 of cables 12. This is accomplished simultaneously and commonly by the use of a mold form that has an interior shape that can be derived from FIG. 2 and an exterior shape defined by the configuration of the cable and the body as shown in FIG. 2. The terms molding and casting are used to refer to this step of the method. In regards to molding or casting, care must be taken with respect to the flow of material and the use of pressure that could deform the shield 16 inwardly crushing the dielectric medium 18 or at least displacing it to alter the dielectric constant effective in that segment and thus create a discontinuity of coaxial transmission path that can result in signal reflections and energy lost as well as signal distortion.

A variety of materials may be employed with respect to forming body 22, such materials being in essence a plastic polymer or silicon-type rubber loaded with conductive particles in the form of spheres such as small glass beads plated over with conductive material, conductive platelets, conductive fibers, and conductive particles. In general, the higher the loading of conductive particles into the plastic matrix, the higher the conductivity and lower resistivity of the path created between the shields 16 and the outside of body 22. This loading, while reducing resistivity, also reduces mechanical strength, and care must be taken in use of the body to make sure that there is both sufficient conductivity and sufficient mechanical strength for different applications and adaptations using the invention. A range of plastic materials, including urethane, acrylics, epoxies and rubbers, may be employed. The use of conductive epoxy forms a body having excellent conductivity and excellent mechanical strength whereas use of some of the other materials may lack mechanical strength on the one hand or conductivity on the other depending upon the load of conductive particles.

As an important point, the use of the invention technique assumes a broad even contact between the shield 16, braid, foil or drain wire and the material of the body 22, an area far greater than the usual contact area of crimped, soldered or IDC terminations afford. This better assures a good connection to fine conductors.

Figure 3:
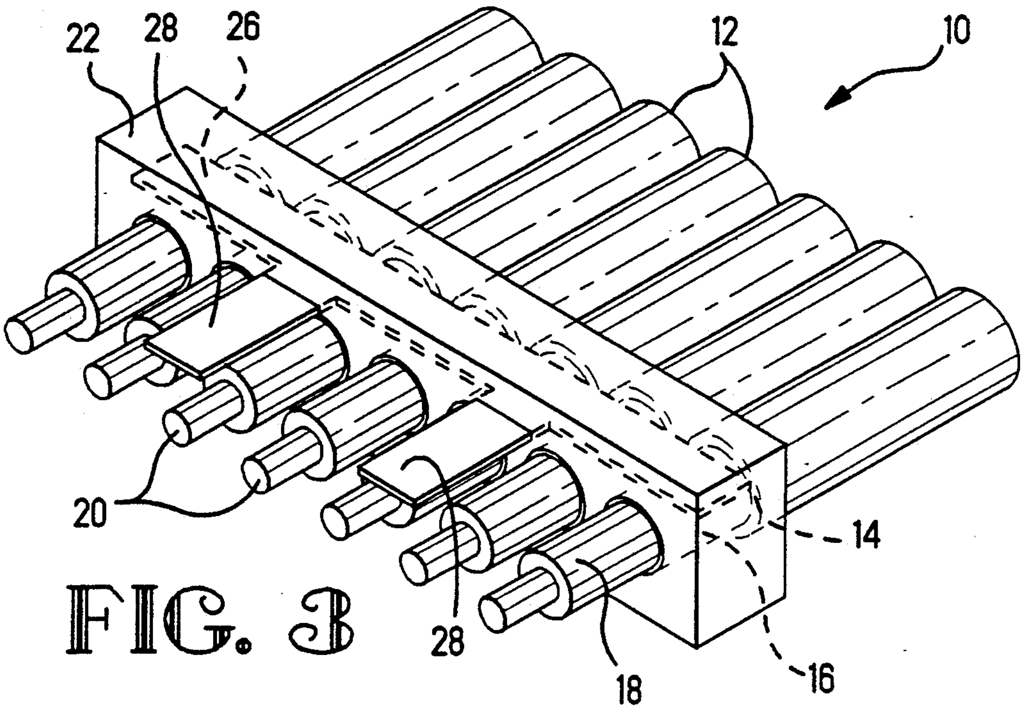
FIG. 3 is a view of the cable of FIG. 1 with a body molded over the braid of the cable and including a bus bar in such body.

FIG. 3 shows an embodiment of the invention similar to that shown in FIG. 2 but including a metal bus bar 26 having contact fingers 28 extending therefrom to facilitate an electrical interconnection of body 22 to grounding paths or shielding circuits associated with the cable. It is contemplated that the bus bar 26 may be inserted into the mold utilized to form body 22 and become part of the body 22. The invention contemplates that the bar 26 may be formed of a thin, relatively soft copper material for use in applications where the fingers 28 will be soldered to a circuit. Alternatively, the bar 26 may be formed of a thin spring grade material, such as brass or phosphor bronze so that the fingers 28 have spring characteristics to engage a grounding or shielding surface of a connector or board resiliently and provide a ready disconnect of the bus bar circuit and cable assembly.

Figure 4:
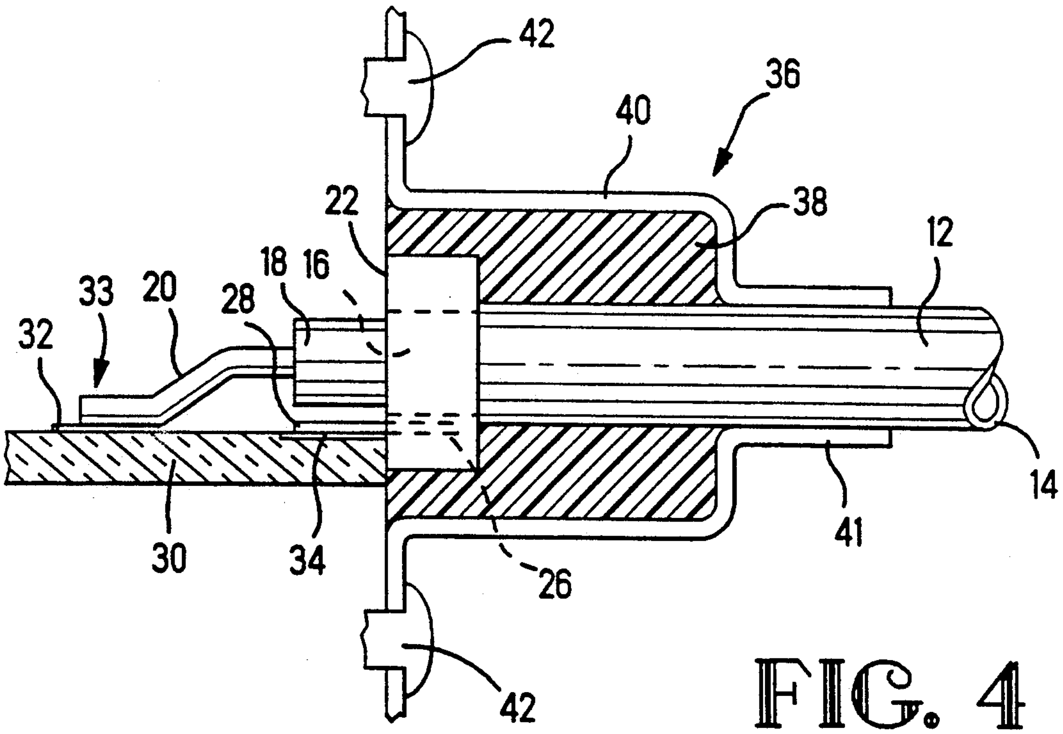
FIG. 4 is a side, partially sectional view showing a cable terminated to a connector and printed circuit board employing the body shown in FIG. 2.

FIG. 4 shows, in cross-section, an application of an assembly of cables 12, the elements of the cable being numbered as before. As can be seen, the cable, as prepared, including body 22, fingers 28, and the signal conductors 20, is positioned within a connector housing 36 that includes a plastic block, that surrounds the outer diameter of cable 12 and extends around block 22. An outer shield 40 is shown, including a portion 41 that fits against the sheath 14 to provide mechanical support. Flanges, as at 42, allow an interconnection of the connector 36 to a chassis or facade associated with equipment served by the cable. In FIG. 4, an interconnection between the cable 12 and a printed circuit board 30 is shown, the signal conductor 20 being connected by solder as at 33 to a signal circuit 32 on the surface of board 30. The bus bar 26, through protruding fingers 28, is shown terminated as by solder or pressure to a circuit 34 forming the ground circuit of the printed circuit board; it being understood that the circuits 32 and 34 are interconnected to traces leading to components mounted on board 30, such circuits being either on surfaces of the board or embedded within the board as is standard practice.

As can be appreciated from FIG. 4, strains applied to cable 12 will be received and resisted by portions of the connector 36 through which the cable passes, but also by the engagement with body 22 fitted within 38. The use of a regular shape, volumetric shape and configuration for body 22 enables a use with connectors having predefined cavities or recesses like that show in FIG. 4. This contrasts with a filling of a material into a cavity following assembly.

Figure 5:
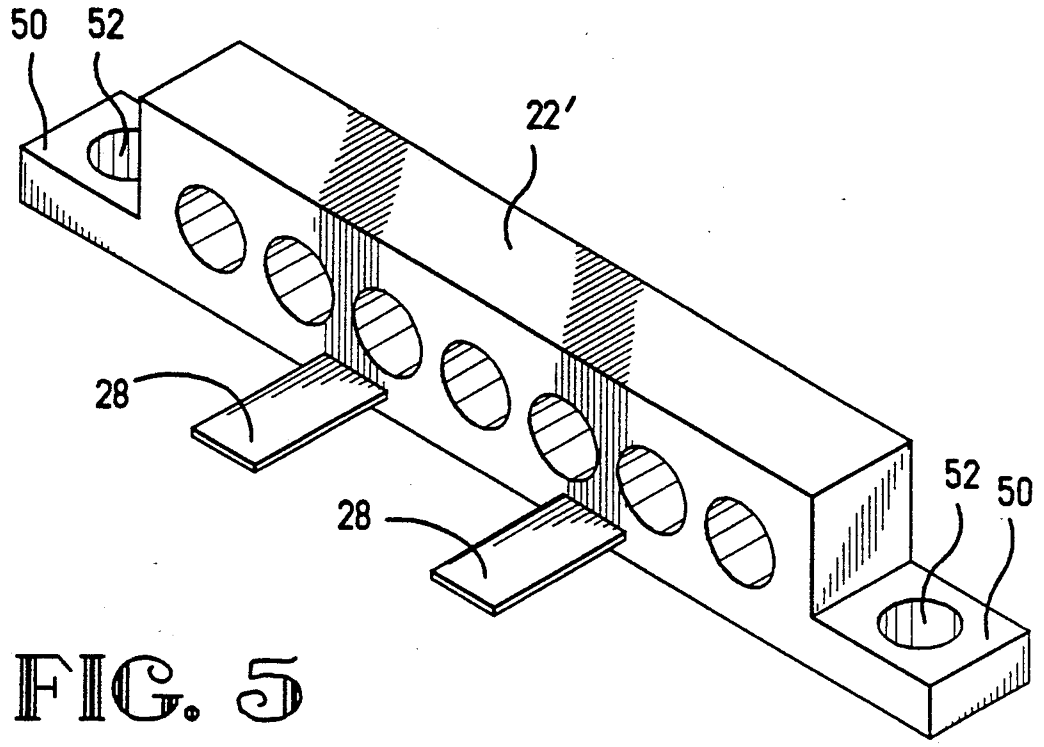
FIG. 5 is a perspective of an alternative configuration of the conductive body of the invention.
Figure 6:
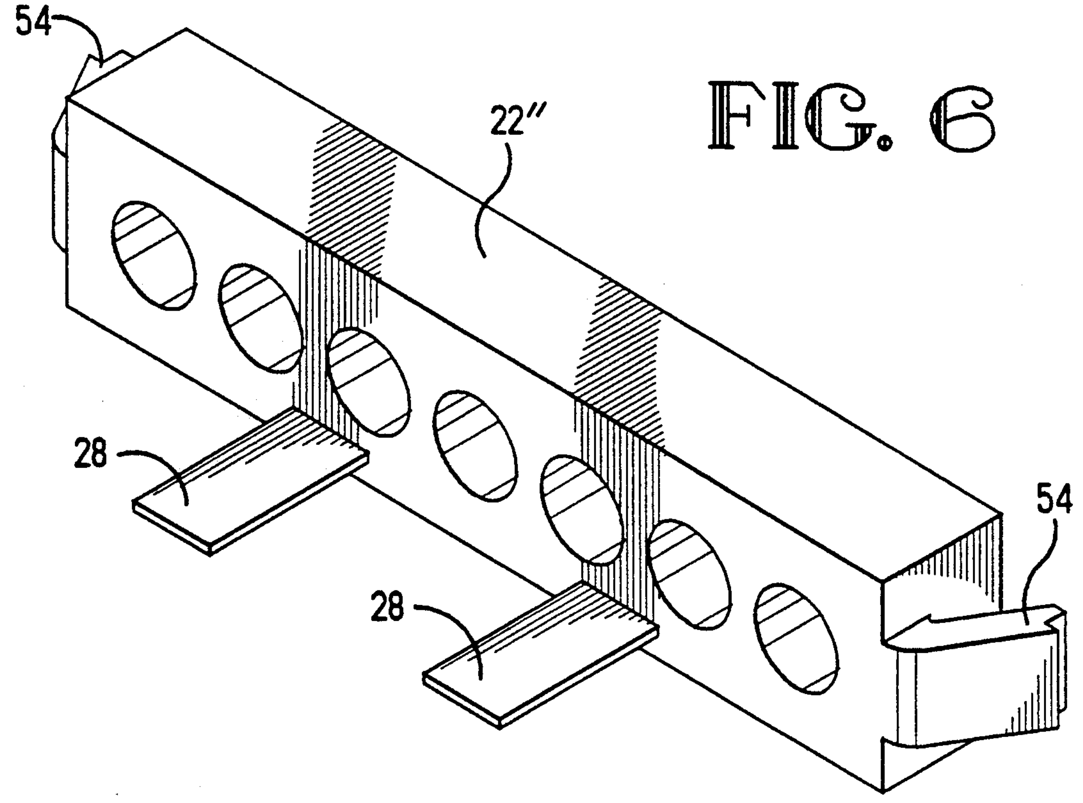
FIG. 6 is a perspective of a further embodiment of the body of the invention.

FIG. 5 shows an alternative body 22' that is made to include ears or projections 50 apertured as at 52 to allow the body to be used directly as a connector and applied to either a further connector or to a printed circuit board or the like. To be noted in FIG. 5 are the fingers 28 protruding from the bulk of the material. With respect to body 22', care must be taken in terms of the choice of the material and the loading of conductive particles to maintain a mechanical strength to allow projections 50 to be employed to lock the cable assembly to a board or the like. FIG. 6 shows a further alternative in the form of a body 22" having ears 54 that have a limited bendability to provide a latching function so that the cable assembly may be plugged into a further connector, not shown, or a mechanical receptacle mounted on a printed circuit board or the like or otherwise employed in interconnecting to further circuits. The conductive characteristics of the body 22 serve to common the grounding shields of numerous cables. With respect to the embodiment of FIG. 6, again a selection must be made of the characteristics of the material employed and the fill of conductive particles to allow use of flexible latch ears such as 54.

Figure 7:
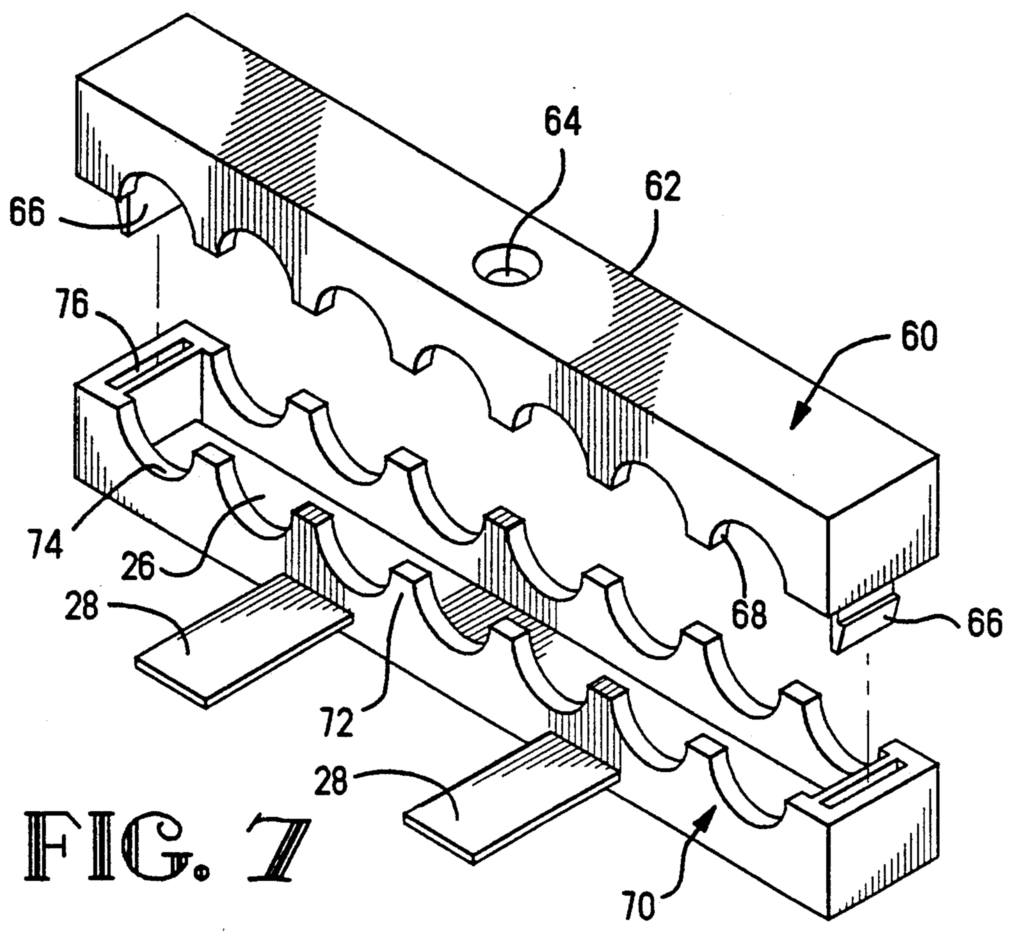
FIG. 7 is a perspective of an alternative embodiment of the invention including a plastic housing utilized to cast or mold the body of the invention.
Figure 8:
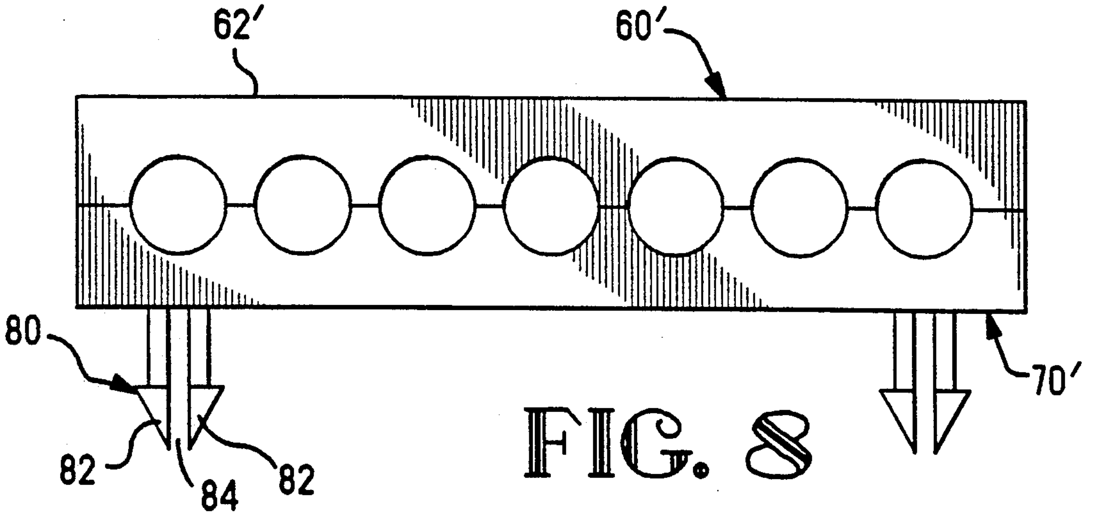
FIG. 8 is a front, elevational view of an alternative housing including fastener means in an alternative embodiment of the invention.

FIG. 7 shows a still further embodiment of the invention in the form of a housing 60, typically made of a light insulating plastic, such as polypropylene or polyethylene or the like. The housing 60 includes a shell 62 having an injection port 64, at least one. On the ends of the shell 62 are latches 66, made flexible and rounded surfaces 68 that f it tightly against the shield 16 of a cable passed therethrough. Housing 60 also includes a shell 70 that has walls 72 apertured as at 74 and including recesses 76 aligned and dimensioned to receive the latches 66. Note that a bus bar 26 is contained within shell 72 with the fingers 28 protruding from the side in this particular embodiment. In FIG. 8, a housing similar to 60 shown as 60' includes shells 62' and 70' and additionally includes fasteners 80 integrally formed with shell 70'. The fasteners 80 at each end include legs 82 separated by a slot 84 and have surfaces to allow the fasteners to be deformed inwardly upon insertion into a hole in a piece of equipment, a grounding shield of a connector, or a printed circuit board.

In practice, a cable assembly 10 is stripped as indicated in FIG. 1, with the housing 60 or 60' applied thereover, snapped together to define an interior volume having the desired configuration of block 22. With the housings in position, suitable conducting material may be injected through a port like 64, the interior venting around the surfaces 68, or if necessary, additional vents being utilized. Depending upon the choice of plastic, the heat and pressure utilized, the housings 60 and 60' may allow either a direct molding from an injection head, care again being taken to limit pressure to avoid crushing of the cable within the housing or, alternatively, a material may be poured in through the port 64 and allowed to f ill the volume and harden over a period of time. Use of these housings can be thus employed to avoid tieing up molding machines in cable end fabrication. Additionally, the use of the housings allow a wider range of plastic material that cannot practically or effectively be used with respect to high speed molding operations, epoxy being one example of such materials.

The housings 60 and 60' insulate essentially the blocks 22 from accidentally touching some circuit and causing problems with the use with assembly, it being necessary in such case to provide an interconnection to the blocks with the bus bar 26 being molded within the housing and including the projecting fingers 28 allowing the block 22 to be interconnected to a grounding and shielding circuits.

It should be now apparent that the invention contemplates an electrical grounding connection that may be used by itself, a connection like that shown in FIG. 2, and as well, a connection that includes a body having surfaces or features as in FIGS. 5 and 6 to assist in fastening or attaching not only the block but the cable and assembly to some equipment or connector served by the cable assembly. The invention also contemplates the use of a separate plastic housing to help form the body of the invention and the methods associated with these different embodiments. The invention contemplates that different features may be employed with respect to these teachings.

Having now described the invention relative to the drawings, claims are attached that are deemed to define the invention.

I claim:

1. A grounding connection including a plurality of cables each comprised of relatively small, fragile elements including a signal conductor carried within a dielectric sleeve and a ground conductor spaced from said signal conductor by the sleeve, the ground conductor being exposed along a segment of its axial length, a body of conductive plastic material surrounding each length of ground conductor in an intimate broad area contact with the surface thereof to electrically interconnect the ground conductors of each of the cables together, the material of the said body having been flowed around the cables within a mold to provide an essentially, regular exterior shape to the body to facilitate handling and use of the connected ends of the cables, and a metal bus bar engaged by said body of conductive plastic material.

2. The connection of claim 1 wherein the said body is of a material sufficiently rigid to define said regular shape and mechanically hold the cables together.

3. The connection of claim 1 wherein the said body is of a semi-rigid material to provide compliance for insertion into a further housing.

4. The connection of claim 1 further including a thin insulating plastic housing having an interior volume and walls to receive the cables and facilitate the flowing of plastic around the ground conductors thereof.

5. The connection of claim 4 wherein the said body is formed of a conductive gel retained by the further housing.

6. A grounding connection including a plurality of cables each comprised of relatively small, fragile elements including a signal conductor carried within a dielectric sleeve and a ground conductor spaced from said signal conductor by the sleeve, the ground conductor being exposed along a segment of its axial length, a body of conductive plastic material surrounding each length of ground conductor in an intimate broad area contact with the surface thereof to electrically interconnect the ground conductors of each of the cables together, the material of the said body having been flowed around the cables within a mold to provide an essentially, regular exterior shape to the body to facilitate handling and use of the connected ends of the cables, and the body includes a latch with attachment surfaces to hold the body relative to a further circuit, connector or the like.

7. In a method of providing a ground interconnection to a plurality of cables of a type having signal conductors surrounded by dielectric sleeves and the sleeves in turn being surrounded by a thin, fragile shield of conductive foil, braid, or the like, the steps comprising:

a: exposing an axial length of each shield of each cable, b. inserting a ground bus and multiple cables in a cavity having a wall configuration to surround the shield length, c. flowing a conductive plastic material to fill said cavity and surround and intimately bond to the ground bus and the shields of said cables providing a solid common grounding contact with the ground bus and to electrically interconnect the said shields of said cables.

8. The method of claim 7 wherein said step of exposing the cable shields includes stripping away an outer protective sheath therefrom to define said exposed length.

9. The method of claim 7 wherein the said step of inserting the cable in a cavity includes providing a plastic housing defining said cavity.

* * * * *